US006859420B1

(12) United States Patent
Coney et al.

(10) Patent No.: US 6,859,420 B1
(45) Date of Patent: Feb. 22, 2005

(54) SYSTEMS AND METHODS FOR ADAPTIVE WIND NOISE REJECTION

(75) Inventors: William B. Coney, Littleton, MA (US); Gregory L. Duckworth, Belmont, MA (US); John C. Heine, Weston, MA (US)

(73) Assignee: BBNT Solutions LLC, Cambridge, MA (US)

( * ) Notice: Subject to any disclaimer, the term of this patent is extended or adjusted under 35 U.S.C. 154(b) by 151 days.

(21) Appl. No.: 10/170,865

(22) Filed: Jun. 13, 2002

Related U.S. Application Data

(60) Provisional application No. 60/306,624, filed on Jul. 19, 2001, and provisional application No. 60/301,104, filed on Jun. 26, 2001.

(51) Int. Cl.[7] .......... H04B 15/00
(52) U.S. Cl. .......... 367/178; 381/94.1; 367/901
(58) Field of Search .......... 367/124, 129, 367/178, 901; 381/71.1, 71.7, 71.14, 94.1; 181/296

(56) References Cited

U.S. PATENT DOCUMENTS

| | | | | |
|---|---|---|---|---|
| 1,345,717 A | | 7/1920 | Thomas | |
| 2,520,706 A | | 8/1950 | Anderson et al. | 181/33 |
| 3,154,171 A | | 10/1964 | Knutson et al. | 181/31 |
| 3,476,208 A | | 11/1969 | Sellman et al. | 181/0.5 |
| 3,550,720 A | | 12/1970 | Ballard et al. | 181/31 |
| 4,153,815 A | | 5/1979 | Chaplin et al. | 179/1 |
| 4,195,360 A | * | 3/1980 | Fothergill | 367/901 |
| 4,570,746 A | | 2/1986 | Das et al. | 181/242 |
| 4,712,429 A | * | 12/1987 | Raspet et al. | 73/646 |
| 5,339,287 A | | 8/1994 | Bauer | 367/140 |
| 5,477,506 A | | 12/1995 | Allen | 367/140 |
| 5,684,756 A | | 11/1997 | Schmitz et al. | 367/188 |
| 5,808,243 A | | 9/1998 | McCormick et al. | 181/0.5 |
| 5,917,921 A | | 6/1999 | Sasaki et al. | 381/94 |
| 6,320,968 B1 | | 11/2001 | Linder | 381/94.7 |

OTHER PUBLICATIONS

L. Beranek, Acoustical Measurements, published for the Acoustical Society of America by the American Institute of Physics, Revised Edition, pp. 258–263.

J. Bleazey, "Experimental Determination of the Effectiveness of Microphone Wind Screens", Journal of the Audio Engineering Society, vol. 9, No. 1, Jan. 1961, pp. 48–54.

W. Neise, "Theoretical and Experimental Investigations of Microphone Probes for Sound Measurements in Turbulent Flow", Journal of Sound and Vibration, 39(3), 1975, pp. 371–400.

M. Shust et al., "Electronic Removal of Outdoor Microphone Wind Noise", Acoustical Society of America 136th Meeting Lay Language Papers, Norfolk, VA, Oct. 1998, pp. 1–5.

William B. Coney et al.; A Semi–Empirical Approach for Modeling Greenhouse Surface Wind Noise; SAE Technical Paper Series; May 17–20, 1999; pp. 1–9.

* cited by examiner

*Primary Examiner*—Ian J. Lobo
(74) *Attorney, Agent, or Firm*—Ropes & Gray LLP

(57) ABSTRACT

A system for rejecting wind noise at a plurality of sensors includes input logic, a processor and output logic. The input logic receives a signal from each of the plurality of sensors. The processor assigns a weight value to each of the received signals. The output logic derives a wind noise rejected output signal based on a function of the assigned weight values and the received signals.

45 Claims, 4 Drawing Sheets

SYSTEMS AND METHODS FOR ADAPTIVE WIND NOISE REJECTION

CROSS REFERENCE TO RELATED APPLICATIONS

The instant application claims priority from provisional application No. 60/301,104, filed Jun. 26, 2001, and provisional application No. 60/306,624, filed Jul. 19, 2001, the disclosures of which are incorporated by reference herein in their entirety.

The instant application is related to co-pending Application No. 60/306,624, entitled "Systems and Methods for Adaptive Noise Cancellation" and filed on a same date herewith, the disclosure of which is incorporated by reference herein.

FIELD OF THE INVENTION

The present invention relates generally to systems and methods for acoustic detection and, more particularly, to systems and methods for rejecting wind noise in acoustic detection systems.

BACKGROUND OF THE INVENTION

A number of conventional systems detect, classify, and track air and ground bodies or targets. The sensing elements that permit these systems to perform these functions are typically arrays of microphones whose outputs are processed to reject coherent interfering acoustic noise sources (such as nearby machinery). Other sources of system noise include general acoustic background noise (e.g., leaf rustling) and wind noise. Both of these sources are uncorrelated between microphones. They can, however, be of sufficient magnitude to significantly impact system performance.

While uncorrelated noise is addressed by spatial array processing, there are limits to signal-to-noise improvements that can be achieved, usually on the order of 10*log N, where N is the number of microphones. Since ambient acoustic noise is scenario dependent, it can only be minimized by finding the quietest array location. At low wind speeds, system performance will be limited by ambient acoustic noise. However, at some wind speed, wind noise will become the dominant noise source—for typical scenarios, at approximately 5 mph at low frequencies. The primary source of wind noise is the fluctuating, non-acoustic pressure due to the turbulent boundary layer induced by the presence of the sensor in the wind flow field. The impact of an increase in wind noise is a reduction in all aspects of system performance: detection range, probability of correct classification, and bearing estimation. For example, detection range can be reduced by a factor of two for each 3–6 dB increase in wind noise (depending on acoustic propagation conditions).

Therefore, there exists a need for systems and methods that can reduce wind noise so as to improve the performance of acoustic detection systems such as, for example, acoustic detection systems employed in vehicle mounted systems for which the effective wind speed includes the relative velocity of the vehicle when the vehicle is in motion.

SUMMARY OF THE INVENTION

Systems and methods consistent with the present invention address this and other needs by providing a multi-sensor windscreen assembly, and associated wind noise rejection circuitry, to enable the detection of a desired acoustic signal while maximizing rejection of wind noise. Multiple sensors, consistent with the present invention, may be distributed across a surface of a three dimensional body, such as a sphere, cylinder, or cone. Adaptive weights may be applied to the signal output from each of the multiple sensors so as to pass low wind noise signals and reject those with high wind noise. Signals from sensors subjected to high levels of unsteady pressures due to wind turbulence may be given low weights and, thus, substantially rejected, while signals from sensors not subjected to these flow disturbances may be given large weights and, thus, substantially passed. The values of the adaptive weights may be continuously, or periodically, updated in order to account for wind direction and speed changes at the multi-sensor windscreen assembly. Systems and methods consistent with the present invention, thus, provide an adaptive windscreen system that can reject wind noise and, thereby, improve the measurement and detection of desired acoustic signals.

In accordance with the purpose of the invention as embodied and broadly described herein, a method of rejecting wind noise includes distributing a plurality of acoustic sensors over a surface of a body; identifying at least one sensor of the plurality of acoustic sensors that is subject to low wind noise; passing signals from the at least one identified sensor as low wind noise signals; and rejecting signals from non-identified sensors of the plurality of acoustic sensors as high wind noise signals.

In another implementation consistent with the present invention, a method of rejecting signal noise includes receiving signals from a plurality of sensors and assigning a weight value to each of the received signals. The method further includes deriving a noise rejected output signal based on a function of the assigned weight values and the received signals.

In a further implementation consistent with the present invention, a windscreen includes a three dimensional body mounted on a first surface, the body configured to rotate with respect to the first surface and comprising at least one second surface. The windscreen further includes a plurality of sensors distributed on the at least one second surface of the body, the sensors configured to sense forces acting upon the body.

BRIEF DESCRIPTION OF THE DRAWINGS

The accompanying drawings, which are incorporated in and constitute a part of this specification, illustrate embodiments of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims.

Systems and methods, consistent with the present invention, provide mechanisms that adaptively reject noise in multiple signals received from a multi-sensor device. A processor of the present invention assigns a weight parameter to each signal of the multiple signals. Each assigned weight parameter may correspond to a noise level of the associated sensor signal. Output circuitry may derive a noise rejected output signal based on a function of the assigned weight parameters and the received signals. In some embodiments, for example, the output circuitry may include multiplier elements and a summer. In this case, the noise rejected output signal may include a summation of the products of each assigned weight parameter with its respective sensor signal.

Exemplary Multi-Senor-Assembly

Figure 1:
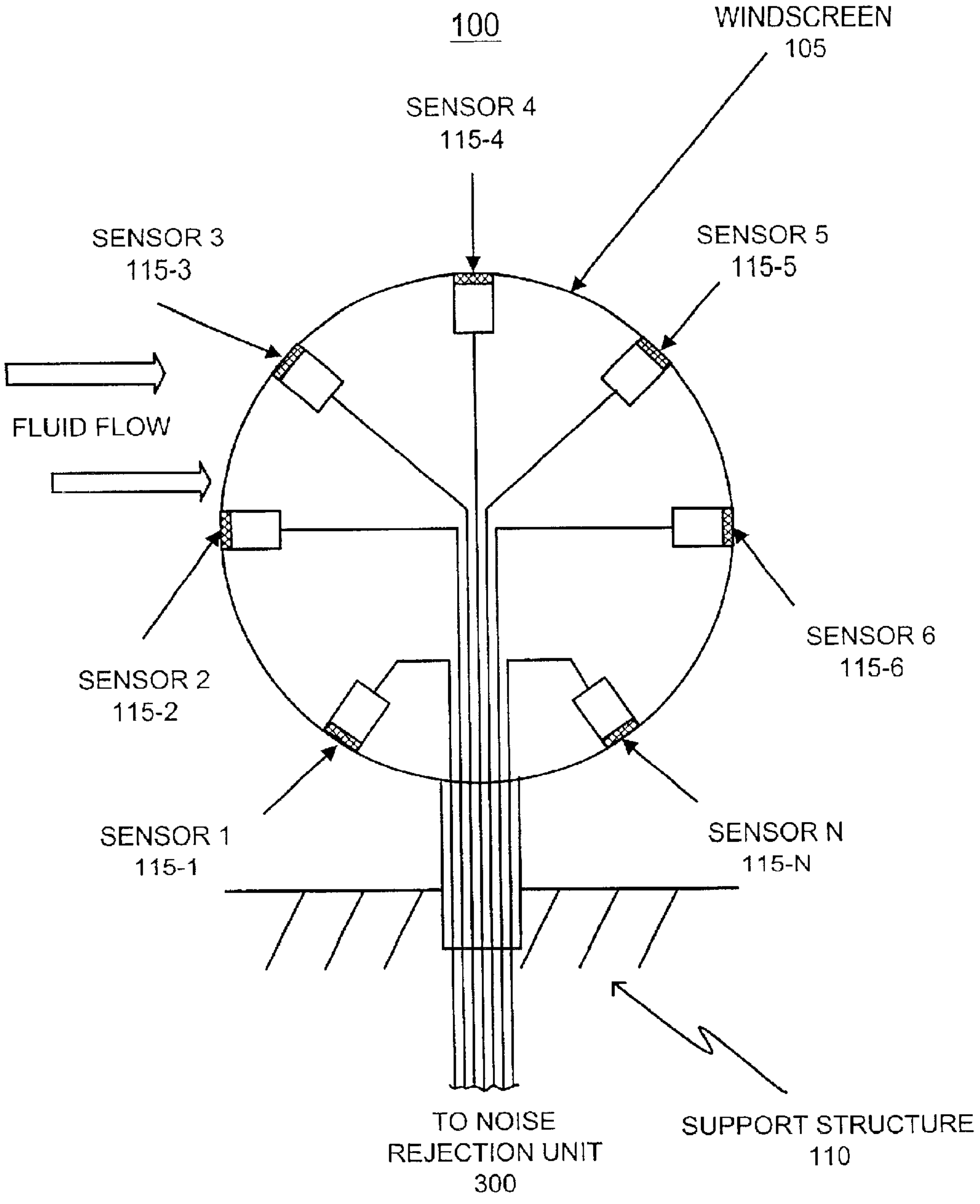
FIG. 1 illustrates an exemplary multi-sensor assembly consistent with the present invention.

FIG. 1 illustrates an exemplary multi-sensor assembly 100 consistent with the present invention. Multi-sensor assembly 100 may include a windscreen 105 coupled to a support structure 110. As illustrated, windscreen 105 may be configured as a three dimensional sphere. Windscreen 105 may, alternatively, be configured as a three dimensional cylinder, cone or other shape (not shown). Windscreen 105 may further be constructed of a rigid, semi-rigid, or solid material. Windscreen 105 may also be constructed of a permeable or non-permeable material. For example, windscreen 105 may be constructed of foam and, thus, would be semi-rigid and permeable to fluids such as air or water. As an additional example, windscreen 105 may be constructed of a solid material such as plastic or the like that would be non-permeable to fluids and rigid.

Figure 2:
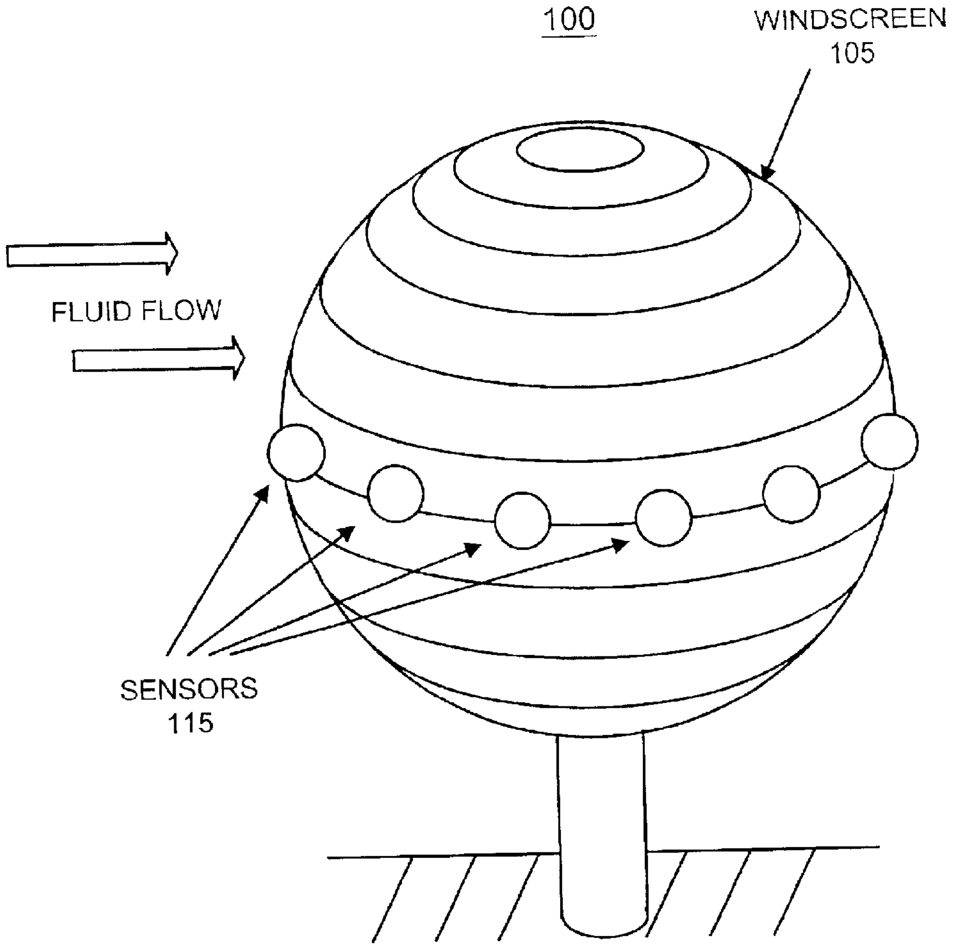
FIG. 2 illustrates an exemplary multi-sensor assembly with a spherical windscreen and equatorially distributed sensors consistent with the present invention.

As shown in FIG. 1, multiple sensors (sensor 1 115-1 through sensor N 115-N) may be distributed on a surface of windscreen 105. As further illustrated in FIG. 2, the multiple sensors 115 may be distributed around an equator of spherical windscreen 105. One skilled in the art will recognize, also, that other sensor distributions may be possible. For example, sensors 115 may be distributed at icosahedral points (not shown) on the surface of spherical windscreen 105. Distribution of the sensors across a surface of windscreen 105 can depend on the shape of the windscreen (e.g., spherical, cylindrical, conical) and the particular air-flow anticipated upon the windscreen.

Each of the multiple sensors 115 may include any type of conventional transducer for measuring force of pressure. A piezoelectric transducer (e.g., a microphone) is one example of such a conventional transducer. In some embodiments of the present invention, each of the multiple sensors 115 may measure acoustic and non-acoustic air pressure.

Exemplary Wind Noise Rejection Unit

Figure 3:
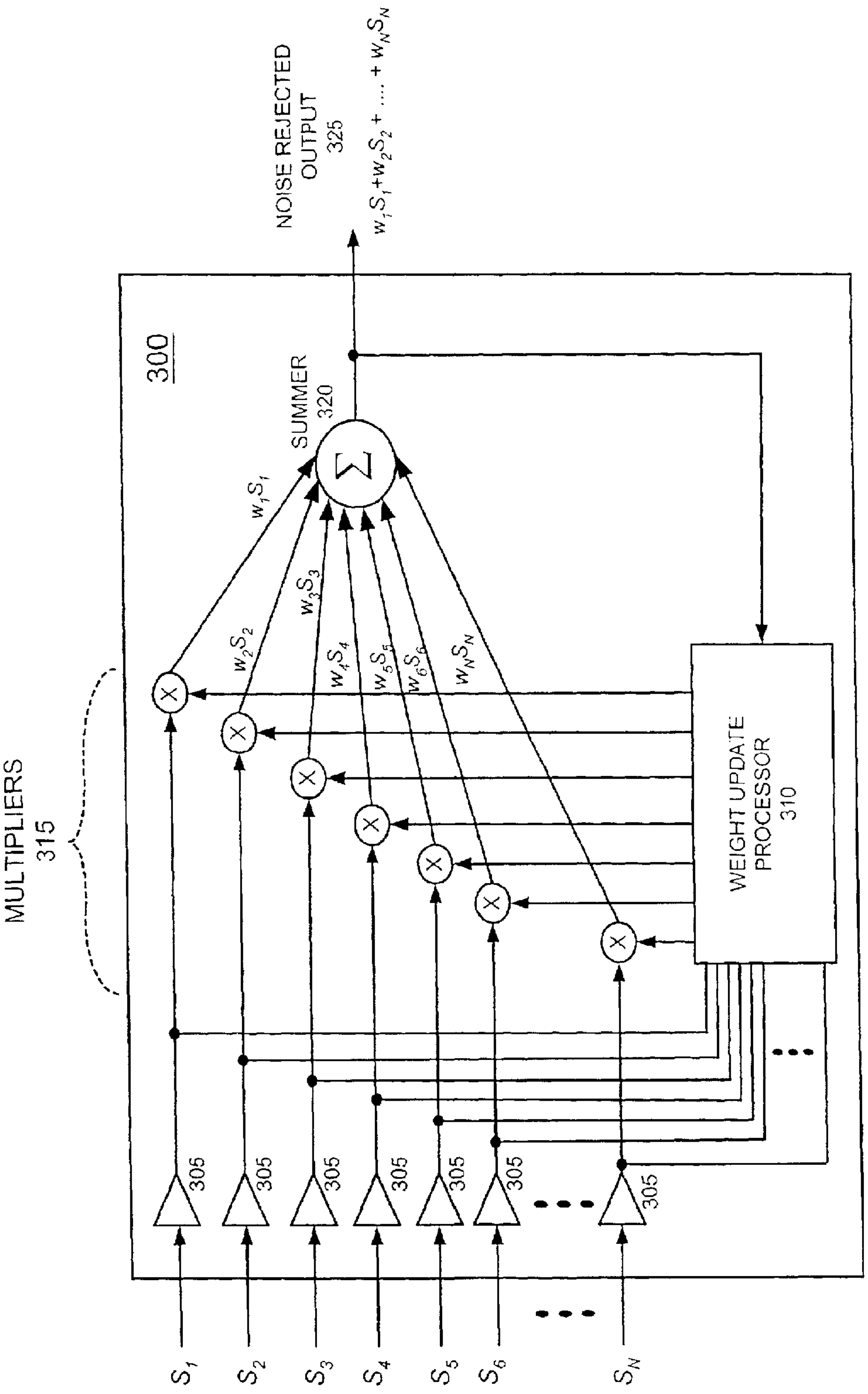
FIG. 3 illustrates exemplary components of a noise rejection unit consistent with the present invention.

FIG. 3 illustrates an exemplary unit 300 in which systems and methods, consistent with the present invention, may be implemented for rejecting wind noise sensed at a multi-sensor device, such as multi-sensor assembly 100. Wind rejection unit 300 may include multiple input buffers 305, a weight update processor 310, multiple multipliers 315, and a summer 320. The weights $\{w_1, w_2, \ldots, w_N\}$ supplied by weight update processor may be frequency dependent, and thus FIG. 3 represents one frequency "slice" of the entire frequency spectrum. A bank of units 300 may be implemented, for example, in hardware or software, to cover the entire desired frequency band. Input buffers 305 may receive signals from each sensor 115 of multi-sensor assembly 100 and pass the signals to multipliers 315 and weight update processor 310. Weight update processor 310 may receive each signal $\{S_1, S_2, \ldots, S_N\}$ from multi-sensor assembly 105 and, according to a process, such as the exemplary process described with respect to FIG. 4 below, may provide weights to each of the multiplier elements 315 based on each received signal. Multiplier elements 315 may multiply each of the provided weights with a corresponding sensor signal.

The weighted signals $\{w_1S_1, w_2S_2, \ldots, w_NS_N\}$ from multiplier elements 315 may be summed at summer 320. The summed weighted signals $(w_1S_1+w_2S_2+\ldots+w_NS_N)$ can be output from wind rejection unit 300 as a noise rejected output signal 325. This noise-reduced output signal 325 may be used in a conventional acoustic detection system (not shown) for detecting, classifying, and tracking objects or targets.

Exemplary Wind Noise Refection Process

Figure 4:
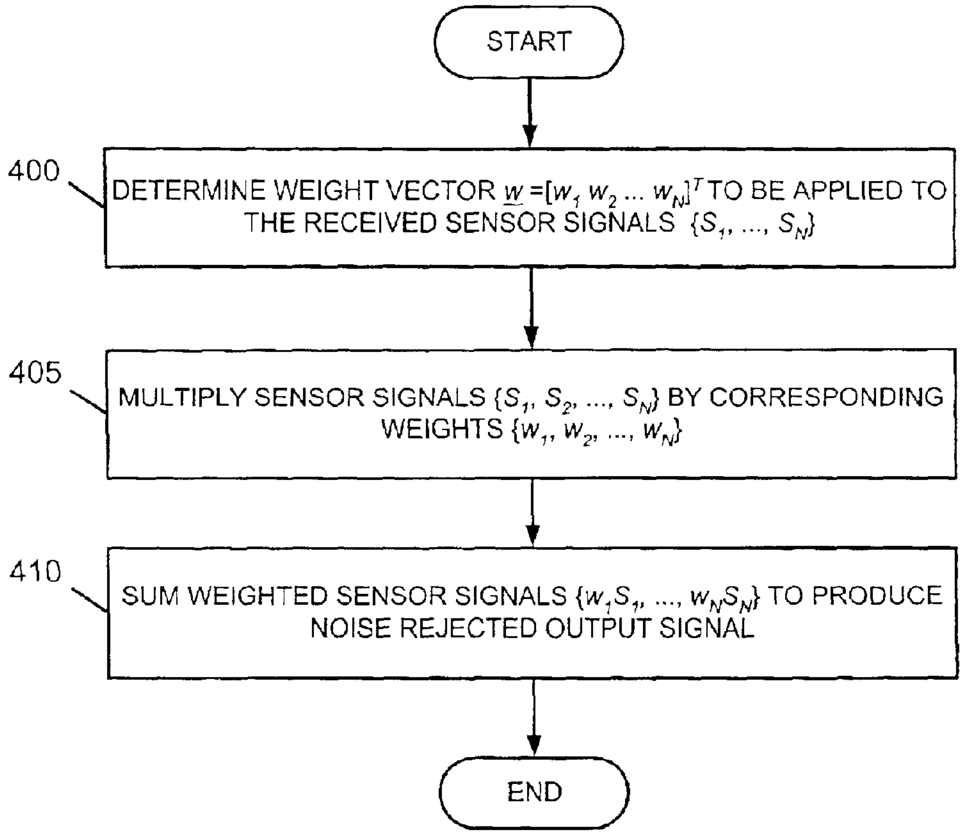
FIG. 4 is a flowchart that illustrates an exemplary process for wind noise rejection consistent with the present invention.

FIG. 4 illustrates an exemplary process, consistent with the present invention, for rejecting wind noise contained in signals $\{S_1, S_2, \ldots, S_N\}$ received from multiple sensors. The exemplary process may begin by determining a vector w of optimal minimum variance weights that can be applied to the received sensor signals $\{S_1, S_2, \ldots, S_N\}$ [act 400]. Weight vector w can be determined using the following equation:

$$w=[W_1w_2 \ldots w_N]^T=R^{-1}/1R^{-1}1 \qquad \text{Eqn. (1)}$$

where

R is the covariance matrix of the sensor signals over the current frequency "slice," and 1 is the vector of N ones.

R can be determined according to the following equation:

$$R=E\{SS^T\} \qquad \text{Eqn. (2)}$$

where E is the expected value, and $$S=[S_1S_2 \ldots S_N]^T.$$

Weight update processor 310 may, for example, determine the optimal minimum variance weights represented by weight vector w. The optimal minimum variance weight vector w may pass low wind noise sensor signals and may reject high wind noise sensor signals. Signals from sensors subjected to high levels of unsteady pressures due to turbulence and wake flow may, thus, be rejected by unit 300, while signals from sensors located a distance away from the flow disturbances may be given large weight values. The formulation represented by Eqns. (1) and (2) may be appropriate for a sensor array whose maximum dimension is small compared with the signal wavelength of interest. Those skilled in the art will recognize that many variants and modifications to this optimal weight calculation, and the time-varying estimation of the covariance matrix, R, may exist and may be used in the present invention.

The sensor signals $\{S_1, S_2, \ldots, S_N\}$ may then each be multiplied by their corresponding weight $\{w_1, w_2, \ldots, w_N\}$ of weight vector w [act 405]. For example, a corresponding multiplier element 315 can multiply each sensor signal by a respective assigned weight. The weighted sensor signals $\{w_1S_1, w_2S_2, \ldots, w_NS_N\}$ may then be summed to produce a noise rejected output signal 325 $(w_1S_1+w_2S_2+\ldots+w_NS_N)$ [act 410]. Summer 320 of wind rejection unit 300 may, for example, sum each of the weighted sensor signals. The noise-reduced output signal 325 may, for example, be used in a conventional acoustic detection system for detecting, classifying, and/or tracking objects or targets.

Conclusion

Systems and methods, consistent with the present invention, provide mechanisms that enable the detection of a desired acoustic signal incident at a multi-sensor windscreen assembly while maximizing rejection of wind noise. The multi-sensor windscreen assembly may include multiple sensors distributed across a surface of a three dimensional windscreen, such as a sphere, cylinder, or cone. Noise rejection circuitry may apply adaptive weights to the signal output from each of the sensors so as to pass low wind noise signals and reject high wind noise signals. Signals from sensors subjected to high levels of unsteady pressures due to wind turbulence and wake flow will be given low weights and, thus, substantially rejected, while signals from sensors not subjected to these flow disturbances will be given large weights and, thus, substantially passed. The values of the adaptive weights may be continuously, or periodically, updated in order to account for wind direction and speed changes at the multi-sensor windscreen assembly.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, while certain components of the invention have been described as implemented in hardware and others in software, other configurations may be possible. Furthermore, while the use of weights has been described above as one exemplary method for selecting the sensor signals to be used to compose noise rejected output signal, mechanical rotation of windscreen 105 may provide the mechanism for selecting the sensor signals that are to compose the noise rejected output signal. In such an embodiment, windscreen 105 may be rotated and the signals of the sensors facing into the wind may be used for composing the noise rejected output signal, while signals from sensors facing away from the wind would not be used. In some exemplary embodiments, windscreen 105 may include a streamlined body with fins attached at the rear, thus, permitting windscreen 105 to rotate in the manner of a weathervane.

Also, while series of acts have been described with regard to FIG. 4, the order of the acts may be altered in other implementations. No element, step, or instruction used in the description of the present application should be construed as critical or essential to the invention unless explicity described as such. The scope of the invention is defined by the following claims and their equivalents.

What is claimed is:

1. A method of rejecting wind noise, comprising:

distributing a plurality of acoustic sensors over a surface of a body;

identifying at least one sensor of the plurality of acoustic sensors that is subject to low wind noise to obtain at least one identified sensor;

passing signals from the at least one identified sensor as low wind noise signals; and rejecting signals from non-identified sensors of the plurality of acoustic sensors as high wind noise signals.

2. The method of claim 1, wherein identifying at least one sensor of the plurality of acoustic sensors further comprises:

identifying at least one sensor of the plurality of acoustic sensors as a function of a rotation of the body.

3. The method of claim 1, wherein the plurality of acoustic sensors comprise N sensors and wherein signals from the plurality of acoustic sensors comprise the vector $S=[S_1\ S_2\ .\ .\ .\ S_N]^T$.

4. The method of claim 3, wherein identifying the at least one sensor of the plurality of acoustic sensors further comprises:

determining a covariance matrix R of the signals from the N sensors, wherein $R=E\{S\ S^T\}$ and wherein E is the expected value.

5. The method of claim 4, wherein identifying the at least one sensor of the plurality of acoustic sensors further comprises:

determining an optimal minimum variance weight vector w, wherein $w=[w_1\ w_2\ .\ .\ .\ w_N]^T=R^{-1}1/1R^{-1}1$ and wherein 1 is a vector of N ones.

6. The method of claim 5, wherein weight values of weight vector w that correspond to acoustic sensors of the N sensors that are subject to low wind noise are assigned high weights.

7. The method of claim 5, wherein weight values of weight vector w that correspond to acoustic sensors of the N sensors that are subject to high wind noise are assigned low weights.

8. The method of claim 5, further comprising:

multiplying the signals from each of the N sensors by corresponding weight values of weight vector w.

9. The method of claim 8, further comprising:

summing the multiplied signals from each of the plurality of acoustic sensors.

10. The method of claim 1, wherein passing signals from the at least one identified sensor as low wind noise signals further comprises:

assigning weights having high weight values to signals from the at least one identified sensor.

11. The method of claim 1, wherein rejecting signals from non-identified sensors of the plurality of acoustic sensors as high wind noise signals further comprises:

assigning weights having low weight values to signals from the non-identified sensors.

12. The method of claim 10, further comprising:

multiplying the signals from the at least one identified sensor by the assigned weights.

13. The method of claim 12, further comprising:

summing each of the multiplied signals to produce a noise rejected output signal.

14. The method of claim 1, wherein the body comprises a three dimensional body.

15. The method of claim 14, wherein the three dimensional body comprises at least one of a sphere, a cylinder, and a cone.

16. A system for rejecting wind noise incident on a surface of a body, a plurality of acoustic sensors being distributed over the surface of the body, the system comprising:

means for identifying at least one sensor of the plurality of sensors that is subject to a low wind noise;

means for passing signals from the at least one identified sensor as low wind noise signals; and means for rejecting signals from non-identified sensors of the plurality of sensors as high wind noise signals.

17. A system for rejecting wind noise at a plurality of sensors, comprising:

input logic configured to receive a signal from each of the plurality of sensors;

a processor configured to assign a weight value to each of the received signals; and output logic configured to derive a wind noise rejected output signal based on a function of the assigned weight values and the received signals.

18. The system of claim 17, the processor further configured to:

assign a low weight value to a low noise level signal.

19. The system of claim 17, the processor further configured to:

assign a high weight value to a high noise level signal.

20. The system of claim 17, wherein the plurality of sensors comprise N sensors and wherein signals from the plurality of acoustic sensors comprise the vector $S=[S_1\ S_2\ \ldots\ S_N]^T$.

21. The system of claim 20, the processor further configured to:

determine a covariance matrix R of the signals from the N sensors, wherein $R=E\{S\ S^T\}$ and wherein E is the expected value.

22. The system of claim 21, the processor further configured to:

determine an optimal minimum variance weight vector w, wherein $w=[w_1\ w_2\ \ldots\ W_N]^T=R^{-1}1/1R^{-1}1$ and wherein 1 is a vector of N ones.

23. The system of claim 22, wherein weight values of weight vector w that correspond to sensors of the N sensors that are subject to low wind noise are assigned high weights.

24. The system of claim 22, wherein weight values of weight vector w that correspond to sensors of the N sensors that are subject to high wind noise are assigned low weights.

25. The system of claim 22, wherein the output logic comprises multipliers.

26. The system of claim 22, the multipliers configured to:

multiply the signals from each of the plurality of sensors by corresponding weight values of weight vector w to produce weighted signals.

27. The system of claim 17, wherein the plurality of sensors comprise pressure sensors.

28. The system of claim 17, wherein the plurality of sensors sense acoustic and non-acoustic pressure.

29. The system of claim 26, wherein the output logic further comprises a summer.

30. The system of claim 29, the summer configured to:

sum the weighted signals to produce the noise rejected output signal.

31. The system of claim 17, further comprising:

a windscreen comprising a three dimensional self enclosed body, the plurality of sensors being distributed on a surface of the body.

32. A method of rejecting signal noise, comprising:

receiving signals from a plurality of sensors to obtain received signals;

assigning a weight value to each of the received signals; and deriving a noise rejected output signal based on a function of the assigned weight values and the received signals.

33. The method of claim 32, further comprising:

assigning a low weight value to a low noise level signal.

34. The method of claim 32, further comprising:

assigning a high weight value to a high noise level signal.

35. The method of claim 32, wherein the plurality of sensors comprise N sensors and wherein signals from the plurality of acoustic sensors comprise the vector $S=[S_1S_2.\ \ldots\ S_N]^T$.

36. The method of claim 35, further comprising:

determining a covariance matrix R of the signals from the N sensors, wherein $R=E\{S\ S^T\}$ and wherein E is the expected value.

37. The method of claim 36, further comprising:

determining an optimal minimum variance weight vector w, wherein $w=[w_1w_2\ \ldots\ w_N]^T=R^{-1}1/1R^{-1}1$ and wherein 1 is a vector of N ones.

38. The method of claim 37, wherein weight values of weight vector w that correspond to acoustic sensors of the N sensors that are subject to low wind noise are assigned high weights.

39. The method of claim 37, wherein weight values of weight vector w that correspond to acoustic sensors of the N sensors that are subject to high wind noise are assigned low weights.

40. The method of claim 37, further comprising:

multiplying the signals from each of the N sensors by corresponding weight values of weight vector w.

41. The method of claim 32, wherein the plurality of sensors comprise pressure sensors.

42. The method of claim 32, wherein the plurality of sensors sense acoustic and non-acoustic pressure.

43. The method of claim 40, further comprising:

summing the weighted signals to produce the noise rejected output signal.

44. The method of claim 32, further comprising:

distributing the plurality of sensors over a surface of a three dimensional self enclosed body.

45. The method of claim 44, wherein the body comprises a windscreen.

* * * * *